(No Model.)
H. H. REYMER & J. F. REAMES.
CHECK ROW CORN PLANTER.
No. 304,753. Patented Sept. 9, 1884.
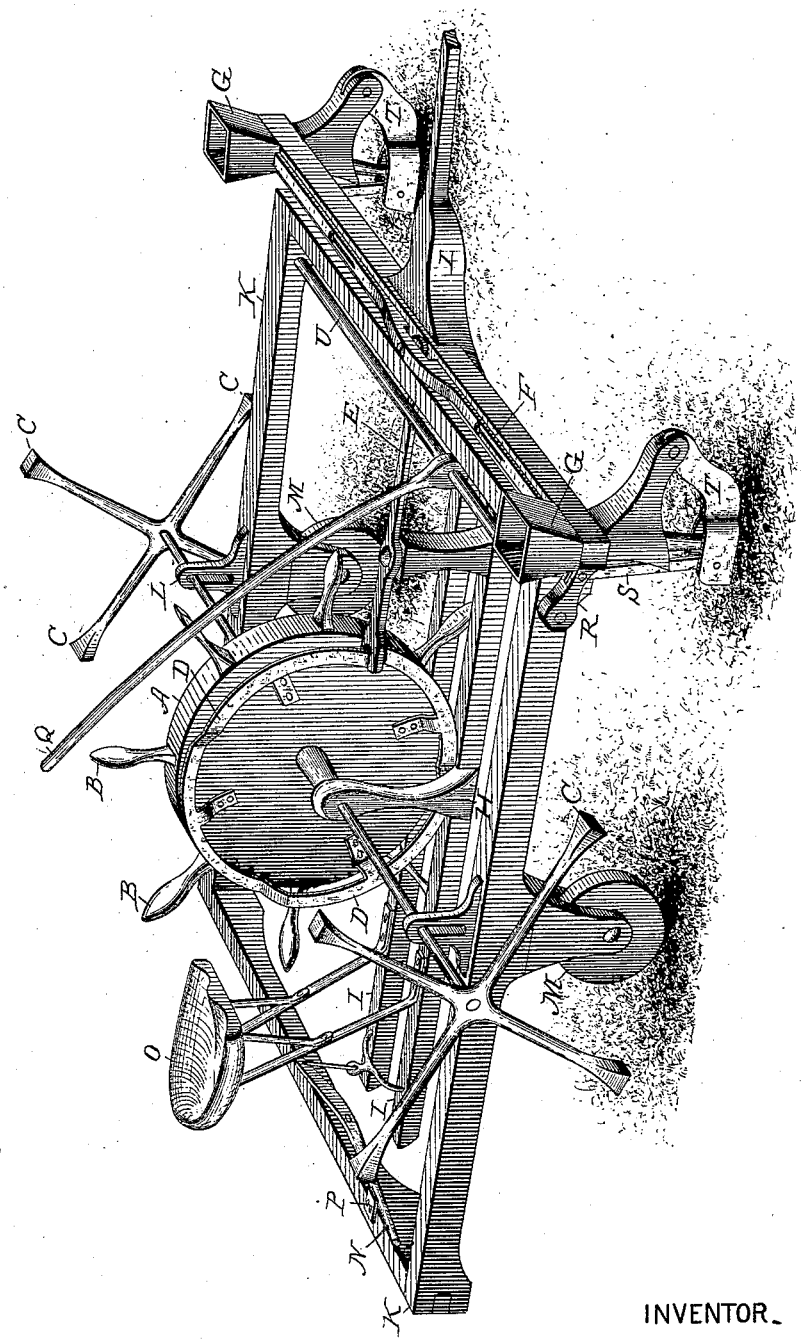
ATTEST_
Geo. T. Smallwood,
J. Henry Kaiser.
INVENTOR_
Henry H. Reymer,
James F. Reames,
Per C. D. Campbell, atty.

United States Patent Office.

HENRY H. REYMER AND JAMES F. REAMES, OF PERRY, LOGAN COUNTY, OHIO.

CHECK-ROW CORN-PLANTER.

SPECIFICATION forming part of Letters Patent No. 304,753, dated September 9, 1884.

Application filed October 24, 1883. (No model.)

*To all whom it may concern:*

Be it known that we, H. H. REYMER and JAMES F. REAMES, citizens of the United States, and residents of Perry township, in the county of Logan and State of Ohio, have invented a new and useful Improvement in Check-Rowers and Corn-Planters, of which the following is a specification.

Our invention is an improvement in check-row corn-planters and drills; and it consists in mounting our marking and dropping devices on a sled independent of the wheels of the machine, so that the marking will not be affected by the inequalities or undulations of the ground, but both the dropping and marking be done evenly on rough ground as well as on smooth, the sled riding over the rough places and the machine always dropping and the arms always marking the same distance apart, regardless of the furrows or holes in the field which the wheels of other droppers trace, making their markings unevenly spaced.

The figure is a perspective view showing our invention.

A is a sprocket-wheel mounted on sled I, which has a beveled and pointed prow. The sled is bifurcated from its rear to the front of the sprocket-wheel, to allow the wheel to revolve and the clods to pass out. The axles of the sprocket-wheel extend beyond the sides of the frame and through a slotted bearing on the same, which allow the wheels M to rise and fall without affecting the sled. On the ends of the axles are four markers, C, placed in such position that they will always mark where the seed is dropped. The driver's seat O is also mounted on the sled.

B are the spuds or sprockets on the wheel, which enter the ground to cause the wheel to turn and prevent its slipping on the ground.

D is the cam-circle mounted on the side of the main wheel; E, pivoted lever reciprocating the feed-slides F and operated by the cam-circle D; G, seed-boxes; H, the standards on the sled, in which the axle of wheel A is journaled; I, sled; K, frame on wheels M, which run on the ground alongside of the sled; L, slotted piece through which the extended axle of the wheel A passes; N, lever by means of which the sled and sprocket-wheel are raised from the ground, throwing the weight of frame, sled, and wheel A onto the wheels M in turning or carrying; O, driver's seat; P, lug under which the lever N is fastened to hold the sled up from the ground; Q, cranks by means of which and arms R S the adjustable shoes T T are regulated as to depth; U, rod connecting the cranks Q and lever R.

The operation of our device is as follows: The lever N is left in the position shown in the drawing until the machine is brought into proper position for dropping, thus keeping the sled I and sprockets B off the ground while traveling. When in proper position for dropping, the lever N is released, when the sled I drops onto the ground, the sprockets take hold in the earth, and as the machine moves forward the wheel A is revolved positively, and the cam-circle D operates the lever E to reciprocate the feed-slides. The weight of the sled and of the wheel A and driver keep the sled firmly on the ground, and its beveled prow pushes the clods aside or pulverizes them as it rides over them. The sled is made long enough to ride two or three furrows at a time, so that when the wheels M sink into a depression the dropper or the markers are not affected; but the sprocket-wheel and markers, being carried by the sled, drop and mark at regular distances, though the wheels M, in following the furrow up and down, may have made a greater distance than the spacing of the rows.

A great trouble has been experienced heretofore in spacing the rows evenly, on account of inequalities of the ground, the markers and droppers having been regulated by the wheels of the machine, which follow the undulations and inequalities of the ground, thus spacing one part of a row where the wheel had to cross a furrow closer than another part of the row where the wheels moved on a level. But it will be seen at a glance that our dropping and marking devices, being carried by the sled which rides the top of the ground in a nearly level path without following the depressions, will always space the rows evenly. The seed-boxes are placed on a transverse piece on the front of the sled and attached to the frame K by links or other flexible connection.

On the sprocket-wheel A, we fasten a cam-circle, D, which plays in the forks of the pivoted arm E to reciprocate the drop-slides. For drilling we attach a circle with a greater number of cams on the other side of the wheel A, to act in similar manner.

In practice we pivot on the back of the frame, beneath the driver's seat, a row-guide, which extends out far enough to allow the end, or a floater carried by it, to drag in the last row dropped and act as a guide. On the row-guide, at the point where it is pivoted to the frame, is mounted a segment-gear. A loose lever, which can be thrown in or out of gear with the segment, enables the driver to raise the row-guide to avoid obstructions, or to turn without leaving his seat. We have not shown this in the drawing, as it is not convenient in this view, and have made no claim for it.

What we claim is—

1. The combination, with the dropping and marking devices of a check-rower, of the operating mechanism mounted on a sled-runner, (which smooths a path for the sprocket-wheel,) as and for the purpose set forth.

2. The combination, with the dropping, marking, and operating devices of a check-rower, mounted on a sled, of the wheeled frame K, on which the same is carried in turning, substantially as described.

3. The combination, with lever E and sprocket-wheel A, cam-circle D, and markers C, all mounted on the bifurcated sled I, of the wheels M, journaled in the frame K, as and for the purpose set forth.

HENRY H. REYMER.
JAMES F. REAMES.

Witnesses:
E. M. CAMPBELL,
M. KERNAN.